Figure 1:
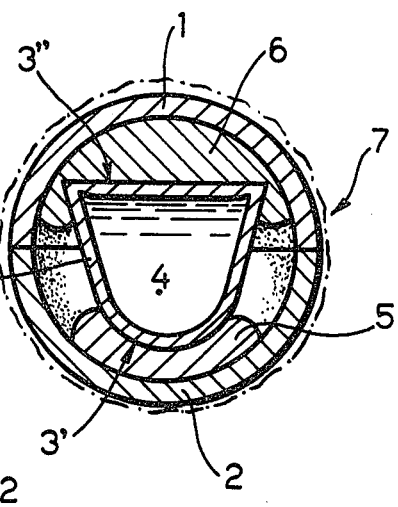

United States Patent [19]

Cillario

[11] 4,430,351
[45] Feb. 7, 1984

[54] CONFECTIONARY PRODUCT WITH A FILLING

[75] Inventor: Lorenzo Cillario, Alba, Italy

[73] Assignee: Ferrero S.p.A., Alba, Italy

[21] Appl. No.: 367,947

[22] Filed: Apr. 13, 1982

[30] Foreign Application Priority Data

Apr. 24, 1981 [IT] Italy ................................ 67561 A/81

[51] Int. Cl.³ .............................................. A23G 3/00
[52] U.S. Cl. ..................... 426/103; 426/660;
426/282; 426/306; 426/613; 426/658
[58] Field of Search ............. 426/660, 103, 282, 306,
426/613, 658

[56] References Cited

U.S. PATENT DOCUMENTS

| 2,851,365 | 9/1958 | Perrozzi | 426/660 |
| 3,769,039 | 10/1973 | Kleinert | 426/660 |
| 3,958,024 | 5/1976 | Fissolo | 426/660 |
| 3,962,473 | 6/1976 | Lilov | 426/660 |
| 4,105,801 | 8/1978 | Dogliotti | 426/613 |
| 4,229,484 | 10/1980 | Steels et al. | 426/660 |
| 4,260,596 | 4/1981 | Mackles | 426/660 |
| 4,344,972 | 8/1982 | Wienecke | 426/103 |

FOREIGN PATENT DOCUMENTS 416970  9/1934  United Kingdom ................ 426/132

Primary Examiner—Jeanette M. Hunter
Attorney, Agent, or Firm—Bernard, Rothwell & Brown

[57] ABSTRACT

Confectionery product comprising a shell formed by two wafer shell halves jointly enclosing a filling.

The filling has a water content not tolerable by the shell of wafer and is contained in a water-impermeable capsule of edible material, lining or bonded to the internal surface of the shell.

12 Claims, 4 Drawing Figures

U.S. Patent     Feb. 7, 1984     4,430,351

CONFECTIONARY PRODUCT WITH A FILLING

The present invention refers to a confectionery product comprising a closed shell formed by two shell halves of wafer which jointly enclose a filling.

In the products of this kind hitherto known the filling is constituted by a mass of normally pasty up to solid consistency, which shall be "substantially anhydrous", in the sense that any humidity contained in the filling shall now produce softening of the wafer shell halves. Otherwise, apart of the unpleasant effect of the shell valves softened by humidity, the product would not be storable, mainly due to mould.

The term "substantially anhydrous", as will be used in the present description with reference to various materials, shall be understood in the sense, indicated above.

The known products produce in consumer's mouth a feeling of "dryness" and this is a reason for which their commercial acceptance is less than what would be desirable. Further, for the same grounds mentioned hereinbefore, the choice of the filling is extremely limited.

This invention provides a confectionery product comprising a shell formed by two wafer shell halves jointly enclosing a filling, said product being characterized in that the filling has a water content detrimental to the shell of wafer and is contained in an artificial capsule (that is formed or built up purposely) impermeable to water, of edible material, said capsule being bonded to the internal surface of the shell. Thus, the wall of the capsule bonded to the shell (locally or on the whole surface) isolates the filling from the shell whereby, on one hand, the wafer shell is not subjected to degradation due to softening or mould and, on the other hand, as to the filling contained in the capsule very wide possibilities of choice are offered among liquids, creams or pasty compositions containing substantial proportions of water which, on consumption, may give a pleasant sensation of freshness or moisture, quite different from the aforementioned "dryness".

Various heat-softenable edible substances are suitable for constituting the material of the capsule. However substances with nutritional value are preferable, provided of a specific taste blendable with that of the filling. Particularly, for a sweet product, the material of the capsule may consist of chocolate, or of a homogeneous fatty mixture of a butter (e.g. cocoa butter) with milk proteins (evaporated skimmed milk), while for example a fatty cheese is particularly suitable for "snacks" of salty or spiced taste. For example, the filling contained in a cheese capsule may be mayonnaise, tartar sauce or similar. A capsule of sweet material, for example of chocolate, may contain for example a liquor, a syrup or juice, or a cream with high water content.

In one embodiment, the capsule may be bonded to the shell by direct bonding of the capsule material with the shell material. In such case, the wafer shell may be entirely lined with the capsule material and the filling contained in the capsule practically occupies the whole volume of the shell and constitutes the only filling in the product.

However, according to another embodiment, the capsule may be bonded to the shell by means of an edible thermoplastic cementing material which is substantially anhydrous (in the sense hereinbefore explained), and in such case the capsule may have any desired shape and, in particular, the cementing material may constitute a "second filling", occupying a part or the whole volume comprised between the capsule and the shell wall. According to a further embodiment of the invention, the capsule may then be constituted by a chocolate praline pre-manufactured separately, containing a filling with a high water content, preferably a liquid filling. Pralines are particularly known, filled with an aqueous sugar solution flavoured with coffee extract or with an alcoholic liquor (rum, brandy, gin, whisky, or other). In the pralines with alcoholic filling the chocolate capsule may be internally lined with a sugar crust, as is known to those skilled in the art. It is not necessary that the whole external surface of the praline be cemented to the whole internal surface of the shell. In many instances a drop of molten cement is sufficient and it is then convenient to use as cement a material similar to that chosen for the capsule, particularly chocolate, a mixture of a butter with milk proteins, or fatty cheese.

Although in the practice of the invention it is preferred that the shell of wafer is without external coating, nevertheless, if desired, the shell may be enrobed with a convenient substance, typically with chocolate.

The expression "water content detrimental to the wafer shell", as used hereinbefore and in the claims, is to be intended in the sense that the filling contained in the capsule would produce a degradation (softening, moulding, fermentative processes) of the wafer if put in direct contact with the latter. This would happen already with a water content as low as 2% by weight or a little more. Nevertheless, for the purpose stated in the introductive paragraphs, the present invention becomes particularly interesting when the water content in the filling contained in the capsule is high enough to produce an effect perceptible by the consumer, that is, in most cases, at least 8–10% by weight. It is evident that particularly interesting cases are those in which said filling is constituted by an aqueous liquid or by an emulsion (cream) water/oil or water/fat.

The size of the product according to the invention is typically that of a "morsel" or "snack", with a shape conveniently chosen among those "compact" (e.g. spherical) and those stick shaped. When the filling in the capsule is liquid, for consumer's convenience compact shapes are preferred, of a size of 2–3 cm. For rectangular stick shapes longitudinal dimensions of 6–8 cm and transverse dimensions of 2–3 cm are recommendable.

In the appended drawing, FIGS. 1, 2, 3 and 4 are sectional elevation views showing four embodiments of the invention.

In all Figures the two wafer shell-halves forming the shell of the product are indicated by reference numerals 1 and 2 and are constituted by mutually identical hemispherical caps so as to jointly form a closed spherical or substantially spherical shell, for example with a diameter of 3 cm.

In FIG. 1, the capsule with the filling is constituted by a praline of chocolate 3 containing an aqueous liquid filling 4. This praline can be manufactured for example in the manner described in Italian Pat. No. 976,428 and in corresponding U.S. Pat. No. 3,962,473 and U.K. Pat. No. 1,405,813. The size of the praline 3 is preferably chosen so as to occupy a substantial part of the internal cross section of the shell, on one hand in order to supply to the consumer a satisfying great amount of aqueous filling and on the other hand in order to simplify bonding. In the illustrated case, the summit 3' of the praline is cemented to the shell 2 by means of a "drop" of cement 5, for example of molten chocolate, whereas the base 3″ of the praline is cemented to the shell 1 by means of a relatively great volume of a cement 6, which may be considered as "second filling" in the product and may be constituted for example by a fatty, substantially anhydrous, heat-softenable mass of the type "nougat".

In order to manufacture the product according to FIG. 1, the cement 6 in heat-softened state is deposited into the shell half 1 and the praline 4 is inserted into the cement. At the other side a drop of molten chocolate 5 is deposited into the shell half 2 and then the shell half 2 is put onto the praline until the two shell half edges are brought to mutual mating. On cooling the two shell halves remain firmly mutually bonded through the "bridge" formed by the praline 3 and by the two cements 5 and 6. For this purpose, obviously, it is not absolutely necessary that the two cements are normally solid, as for example the chocolate of the cement 5. In all embodiments of the present invention the purposely added cements may be of a normally pasty consistence, sufficient to keep the two shell halves united.

Figure 2:
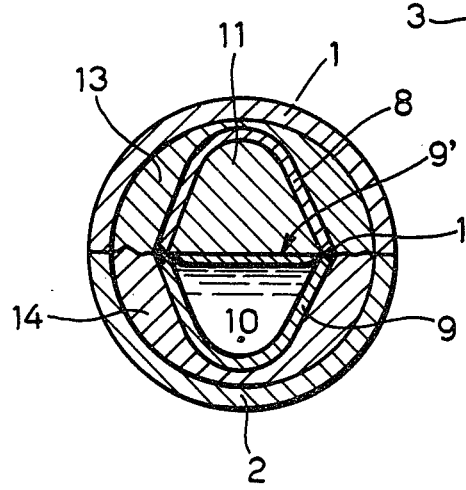

In the embodiment according to FIG. 2 each one of the shell halves 1, 2 contains its own chocolate praline 8, respectively 9. The praline 9 contains a liquid filling 10 sealed by a planar bottom 9', which can be very thin and constituted even by a chocolate film. The praline 8 contains a creamy filling 11 with high water content and may not have a sealing bottom. The rims of the two pralines are mating on the whole circumference and are mutually sealingly bonded by a circumferential continuous weld bead 12 obtained by heating up said rims to melting while they are in mutual contact. The two pralines are cemented to the respective shell halves 1, 2 by means of cements 13, respectively 14, which can be mutually identical and are preferably constituted by substantially anhydrous filling masses, forming a "third filling" in the product and having a taste blending with that of the fillings 10 and 11. The two cements 13, 14 can mutually contact and bond, as shown, or can be mutually separed by an air gap (as in FIG. 1). The process of manufacture is evident from what has been hereinbefore described and therefore does not need detailed description.

Figure 3:
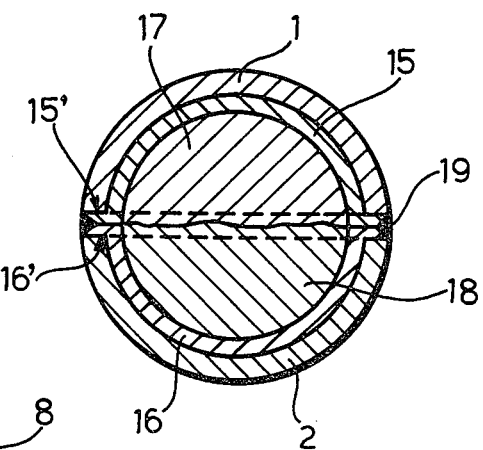

In the product according to FIG. 3 the material of the capsule forms a continuous lining layer on the whole internal surface of each of the two shell halves and coats also the mating edges of the shell halves forming between the latter a circumferential mutual weld rim for said edges. Particularly, in the shell half 1 a chocolate lining layer 15 is formed, which extends (at 15') also on the edge of the shell half, by means of the "slush molding" technique usually employed for the manufacture of the hollow bodies of the pralines 3, 8, 9, that is by pouring molten chocolate in the shell half 1 and then pouring away the excess. In the same way in the shell half 2 a chocolate lining 16 is formed which coats the edge of the shell half. Afterwards the two shell halves thus prepared are filled with filling masses 17, 18 with high water content which, if desired, may be identical. Particularly suitable are the creamy masses described in Italian Pat. application No. 68798-A/79 dated Nov. 9, 1979 in the name of applicant's Company (French application No. 80.19089; German application DE-OS No. 30 15 825 U.S. Pat. No. 4,298,625 granted Nov. 3, 1982), which are aerated foams of certain oil-in-water emulsions, containing 17–35% by weight of water and nevertheless storable for a long time. The shell halves thus filled are then coupled, so that the coating portions 15' and 16' mate to jointly form a continuous circumferential weld rim between the facing edges of the shell halves. The last step of the process consists in heating this weld rim up to substantial softening or melting, and in leaving it cooling, thus obtaining a continuous circumferential weld bead denotd by 19 which permanently bonds the two shell halves.

If desired, the linings 15, 16 may be obtained for example from molten cheese, and the fillings 17, 18 may be constituted for example by mayonnaise or by tartar sauce.

Figure 4:
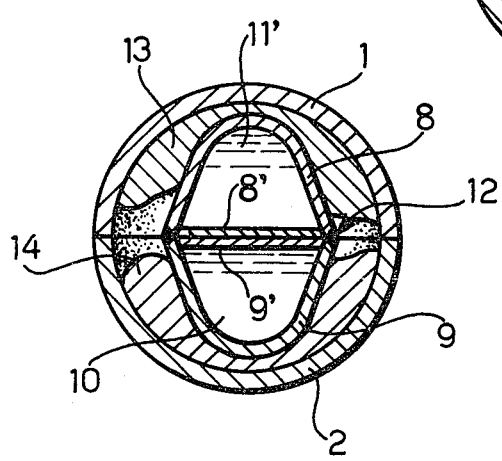

The product according to FIG. 4 is substantially similar to that of FIG. 2 and the corresponding parts are denoted with the same reference numerals. The relevant difference resides in that similarly to the praline 9, also the praline 8 contains a liquid filling, denoted by 11', and is sealed by a thin chocolate layer 8' similar to the sealing film 9' of the praline 9. For example, the filling 10 may be constituted by an aqueous sugar solution of a brandy, while the filling 11' may be constituted by an aqueous sugar solution flavoured with coffee extract, and both pralines may have an internal crust of crystallized sugar.

I claim:

1. A confectionary product comprising an edible water-impermeable capsule bonded on its outer surface to the internal surface of a pair of edible wafer shell halves, said shell halves jointly forming a closed shell around said capsule, said capsule functioning to assist in holding said shell halves together, and said capsule containing an edible filling having a water content which would be detrimental to said wafer shell under conditions of direct contact between said filling and said wafer shell, said capsule preventing contact between said filling and said wafer shell.

2. A confectionery product according to claim 1, in which the material of the capsule is selected from the group consisting of chocolate, a fatty homogeneous mixture of a butter with milk proteins or a fatty cheese.

3. A product according to claim 1 or 2, in which the capsule is bonded to the shell by a direct bond of the capsule material with the wafer material of the shell.

4. A product according to claim 1 or 2, in which the capsule is bonded to the wafer shell halves by means of a purposely added edible, substantially anhydrous, thermoplastic material, which is at a consistency at which said wafer shell halves remain united.

5. A product according to claim 4, in which the cementing material is selected from the group consisting of chocolate, a mixture of a butter with milk proteins or a fatty cheese.

6. A product according to claim 4, in which the cementing material constitutes a second filling in the product.

7. A product according to claim 1, wherein the filling is liquid.

8. A product according to claim 1, wherein the filling is creamy or pasty.

9. A product according to claim 4, wherein the capsule with the filling is a liquor-filled praline.

10. A product according to claim 3, wherein the capsule material forms a continuous lining layer on the whole internal surface of the shell halves, said layer also extending upon the edges of the shell halves to form between the latter a circumferential mutual weld rim for said edges.

11. A product according to claim 1, wherein the wafer shell is enrobed with chocolate.

12. A product according to claim 1, wherein the water content of the filling in the capsule is at least 8% by weight.

* * * * *